US009265087B2

(12) United States Patent
Lee et al.

(10) Patent No.: US 9,265,087 B2
(45) Date of Patent: Feb. 16, 2016

(54) METHOD FOR USER EQUIPMENT SETTING SECURITY WITH NETWORK IN WIRELESS COMMUNICATION SYSTEM AND APPARATUS FOR SAME

(75) Inventors: Youngdae Lee, Anyang-si (KR); Seungjune Yi, Anyang-si (KR); Sungduck Chun, Anyang-si (KR); Sungjun Park, Anyang-si (KR); Sunghoon Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 14/004,076

(22) PCT Filed: Mar. 30, 2012

(86) PCT No.: PCT/KR2012/002377
§ 371 (c)(1),
(2), (4) Date: Sep. 9, 2013

(87) PCT Pub. No.: WO2012/134218
PCT Pub. Date: Oct. 4, 2012

(65) Prior Publication Data
US 2013/0343280 A1    Dec. 26, 2013

Related U.S. Application Data

(60) Provisional application No. 61/469,823, filed on Mar. 31, 2011.

(51) Int. Cl.
*H04W 4/00* (2009.01)
*H04W 76/06* (2009.01)
*H04L 29/06* (2006.01)
(Continued)

(52) U.S. Cl.
CPC .............. *H04W 76/06* (2013.01); *H04L 63/20* (2013.01); *H04W 12/04* (2013.01); *H04W 12/06* (2013.01); *H04W 76/068* (2013.01)

(58) Field of Classification Search
None
See application file for complete search history.

(56) References Cited

U.S. PATENT DOCUMENTS

| 8,768,305 B1* | 7/2014 | Singh ...................... H04M 3/16 370/329 |
| 2008/0076425 A1* | 3/2008 | Khetawat et al. ............. 455/436 |
| 2009/0025060 A1 | 1/2009 | Mukherjee et al. |

(Continued)

FOREIGN PATENT DOCUMENTS

| KR | 1020100049076 A | 5/2010 |
| KR | 1020100139098 A | 12/2010 |

OTHER PUBLICATIONS

Draft(2010) 3GPP TS 24.301 V8.6.0, "3rd Generation Partnership Project; Technical Specification Group Core Network and Terminals; Non-Access-Stratum (NAS) protocol for Evolved Packet System (EPS); Stage 3 (Release 8)" Jun. 2010.

*Primary Examiner* — Michael J Moore, Jr.
(74) *Attorney, Agent, or Firm* — Dentons US LLP

(57) ABSTRACT

In the present invention, a method for a user equipment transmitting/receiving a signal with a network in a wireless communication system is disclosed. More particularly, the method comprises the following steps: receiving security setting information from the network; transmitting or receiving data with the network based on the security setting information; receiving a disconnection message from the network; releasing connection from the network; and actuating a timer when an indicator for maintaining the security setting is received from the network, wherein the security setting information is maintained while the timer is actuated.

13 Claims, 12 Drawing Sheets

(51) Int. Cl.
   *H04W 12/04*       (2009.01)
   *H04W 12/06*       (2009.01)

(56) References Cited

U.S. PATENT DOCUMENTS

2009/0247176 A1* 10/2009 Song et al. .................. 455/450
2009/0296675 A1* 12/2009 Tenny .................... H04W 8/26
                                                            370/338
2012/0202491 A1*  8/2012 Fox ..................... H04B 7/2609
                                                            455/435.1
2013/0208699 A1*  8/2013 Häkkinen ........... H04W 76/046
                                                            370/331
2013/0337812 A1* 12/2013 Pekonen et al. .............. 455/436

* cited by examiner

FIG. 3
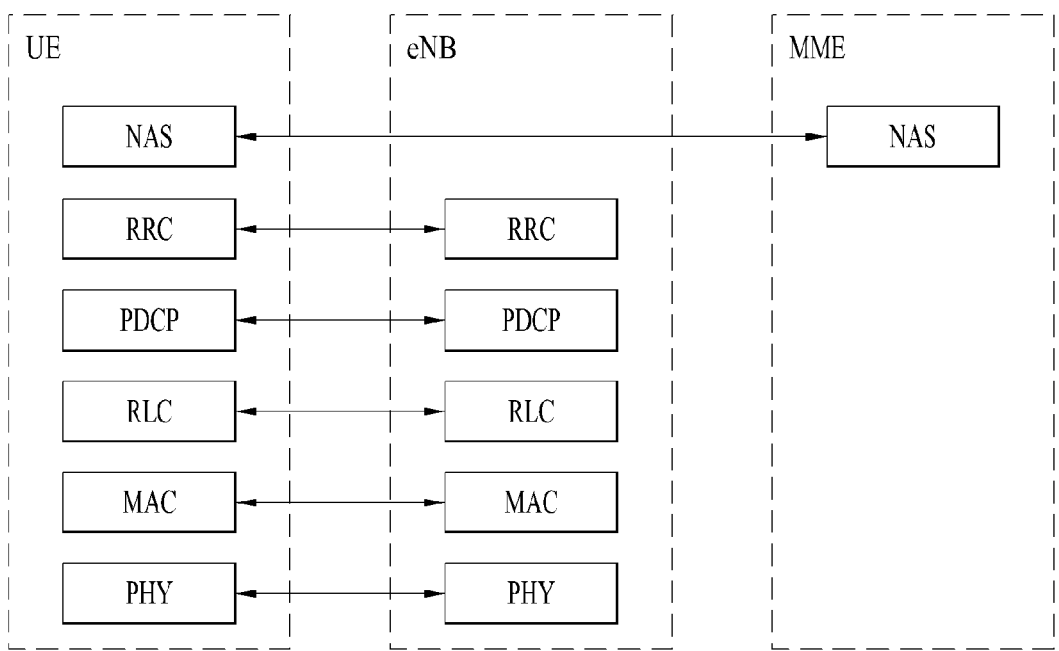
(a) contol - plane protocol stack
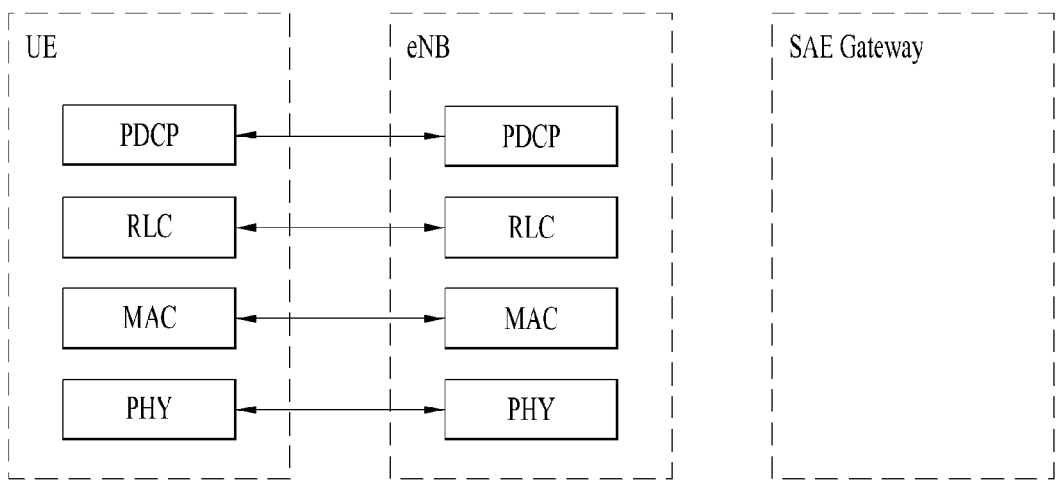
(b) user - plane protocol stack

METHOD FOR USER EQUIPMENT SETTING SECURITY WITH NETWORK IN WIRELESS COMMUNICATION SYSTEM AND APPARATUS FOR SAME

This application is a 35 USC §371 National Stage entry of International Application No. PCT/KR2012/002377 filed on Mar. 30, 2012, and claims priority of U.S. Provisional Application No. 61/469,823 filed on Mar. 31, 2011, which are hereby incorporated by reference in its entirety.

TECHNICAL FIELD

The present invention relates to a wireless communication system, and more particularly, to a method for security configuration of a user equipment with a network in a wireless communication system and an apparatus for the same.

BACKGROUND ART

A $3^{rd}$ generation partnership project long term evolution (3GPP LTE) (hereinafter, referred to as 'LTE') communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (eNode B and eNB), and an Access Gateway (AG) which is located at an end of a network (E-UTRAN) and connected to an external network. The base stations may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

DISCLOSURE

Technical Problem

Based on the aforementioned discussion, an object of the present invention devised to solve the conventional problem is to provide a method for security configuration of a user equipment with a network in a wireless communication system and an apparatus for the same.

Technical Solution

In one aspect of the present invention, a method for transmitting and receiving with a network at a user equipment in a wireless communication system comprises the steps of receiving security configuration information from the network; transmitting or receiving data to and from the network on basis of the security configuration information; receiving a connection release message from the network; releasing connection with the network; and driving a timer when a security configuration maintaining indicator is received from the network, wherein the security configuration information is maintained while the timer is being driven.

In this case, the security configuration maintaining indicator may be included in the security configuration information or the connection release message, and the security configuration information or the connection release message may include information on security sustain time.

Moreover, the method further comprises deactivating the security configuration information when connection with the network is released; and transmitting a connection request message, which includes a security configuration activity indicator, to the network. In this case, the security configuration information is activated when the connection request message is transmitted or when an acknowledgement message to the connection request message is received. Also, the timer may be started again if the security configuration information is activated before the timer expires.

Preferably, the method further comprises deleting the security configuration information when the timer expires or a security configuration delete indicator is received from the network.

In another aspect of the present invention, a method for transmitting and receiving a signal with a user equipment at a network and a user equipment in a wireless communication system comprises transmitting security configuration information to the user equipment; transmitting or receiving data to and from the user equipment on basis of the security configuration information; and transmitting a connection release message to the user equipment, wherein the security configuration information or the connection release message includes a security configuration maintaining indicator.

Also, the method may further comprise releasing connection with the user equipment; and driving a timer, wherein the security configuration information is maintained while the timer is being driven. In this case, the security configuration information is activated when the connection request message is received or when an acknowledgement message to the connection request message is transmitted. Also, the timer is started again if the security configuration information is activated before the timer expires.

Preferably, the method may further comprise deleting the security configuration information when the timer expires or a security configuration delete indicator is transmitted to the user equipment.

Advantageous Effects

According to the embodiment of the present invention, signaling overhead for setting security between the user equipment and the network in the wireless communication system may effectively be reduced.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 3 is a diagram illustrating structures of a control plane and a user plane of a radio interface protocol between a user equipment and an E-UTRAN based on the 3GPP radio access network standard;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition.

Figure 1:
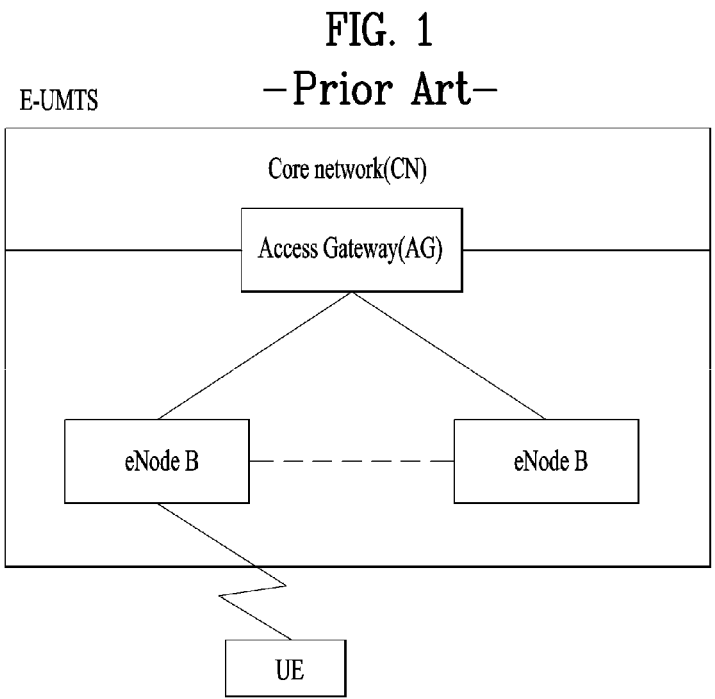
FIG. 1 is a diagram illustrating a network structure of an Evolved Universal Mobile Telecommunications System (E-UMTS), which is an example of a wireless communication system.
Figure 2:
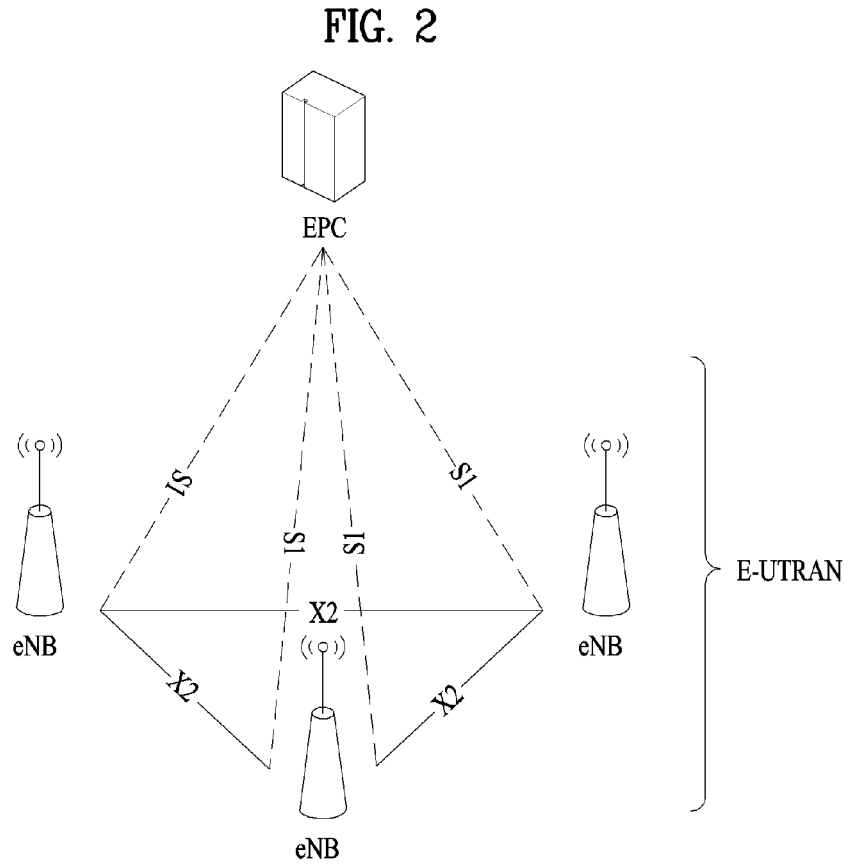
FIG. 2 is a diagram illustrating a network structure of an evolved universal terrestrial radio access network (E-UTRAN)

FIG. 2 is a diagram illustrating a network structure of an Evolved Universal Terrestrial Radio Access Network (E-UTRAN) which is an example of a mobile communication system. In particular, the E-UTRAN system is an evolved version of the conventional UTRAN system. The E-UTRAN includes cells (eNBs), which are connected with each other through an interface X2. Also, each of the cells is connected with a user equipment (UE) through a radio interface and connected with an evolved packet core (EPC) through an interface S1.

The EPC includes a mobility management entity (MME), a serving-gateway (S-GW), and a packet data network-gateway (PDN-GW). The MME includes access information of the user equipment or ability information of the user equipment. The access information or the ability information is mainly used for mobility management of the user equipment. The S-GW is a gateway having the E-UTRAN as an end point, and the PDN-GW is a gateway having a packet data network (PDN) as an end point.

FIG. 3 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer (PHY) is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer, a radio link control (RLC) layer and a packet data convergence protocol (PDCP) layer exist in the second layer. The MAC layer of the second layer serves to map various logical channels into various transport channels. Also, the MAC layer serves to perform logical channel multiplexing for mapping various logical channels into one transport channel. The MAC layer is connected with the RLC layer through a logical channel, wherein the RLC layer is located above the MAC layer. The logical channel is divided into a control channel for transmitting information of the control plane and a traffic channel for transmitting information of the user plane in accordance with a type of information which is transmitted.

Also, the RLC layer of the second layer serves to adjust a size of data received from the higher layer through segmentation and concatenation, whereby the lower layer may transmit the data to a radio interval. Also, the RLC layer provides three operation modes of a transparent mode (TM), an unacknowledged mode (UM), and an acknowledged mode (AM) to assure various quality of services (QoS) required by each radio bearer (RB). In particular, the AM RLC layer performs a retransmission function through an automatic repeat and request (ARQ) function for reliable data transmission.

Finally, the PDCP layer of the second layer performs a header compression function to reduce a size of an IP picketer header, which is relatively great and has unnecessary control information, to efficiently transmit data using IP packets such as IPv4 or IPv6 within a radio interval having a narrow bandwidth. This serves to increase transmission efficiency of the radio interval by transmitting necessary information only from the header part of the data. Also, in the LTE system, the PDCP layer performs a security function that includes ciphering for preventing data monitoring of the third party and integrity protection for preventing data manipulation of the third party.

Various functions performed by the PDCH layer include header compression, ciphering, integrity protection, and PDCH sequence number maintenance, as described above. These functions are performed selectively in accordance with a type of RB.

A radio resource control (RRC) layer of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other.

The radio bearer (RB) may be divided into a signaling radio bearer (SRB) used to transmit RRC message in the control plane and a data radio bearer (DRB) used to transmit user data in the user plane. The DRB may be divided into UM DRB, which uses UM RLC, and AM DRB, which uses AM RLC, in accordance with an operation mode of the RLC which is used.

Hereinafter, RRC state of the user equipment and RRC connection method will be described. The RRC state means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) state. If not so, it may be referred to as RRC idle (RRC_IDLE) state.

Since the E-UTRAN may identify the presence of the user equipment which is in the RRC_CONNECTED state, on the basis of cell unit, it may effectively control the user equipment. On the other hand, the E-UTRAN may not identify the user equipment which is in the RRC_IDLE state, on the basis of cell unit. In this case, the user equipment is managed by the core network (CN) on the basis of tracking area (TA) unit which is a local unit greater than the cell unit. In other words, in order that the user equipment which is in the RRC_IDLE state receives a normal mobile communication service such as voice or data, the user equipment should be shifted to the RRC_CONNECTED state.

In particular, when the user initially turns on the power of the user equipment, the user equipment searches for a proper cell and then is maintained in the RRC_IDLE state in the corresponding cell. The user equipment maintained in the RRC idle state performs RRC connection with the RRC layer of the E-UTRAN only if the RRC connection is required, and then is shifted to the RRC_CONNECTED state. In this case, the case where the RRC connection is required may include a case where uplink data transmission is required due to calling attempt of the user or a case where a response message to a paging message received from the E-UTRAN should be transmitted.

In the meantime, a non-access stratum (NAS) layer located above the RRC layer performs functions such as session management and mobility management. For mobility management of the user equipment, two types of states, an EPS mobility management registered (EMM-REGISTERED) state and an EMM unregistered (EMM-UNREGISTERED) state are defined in the NAS layer. These two states are applied to the user equipment and the MME. The user equipment is initially in the EMM-unregistered state, and performs a registration procedure with the corresponding network through an initial attach procedure to access the network. If the initial attach procedure is successfully performed, the user equipment and the MME are in the EMM registered state.

Also, in order to manage signaling connection between the user equipment and the EPC, two types of states, an EPS connection management (ECM) idle (ECM_IDLE) state and an ECM connected (ECM_CONNECTED) state are defined in the NAS layer. These two states are applied to the user equipment and the MME. If the user equipment of the ECM idle state is RRC connected with the E-UTRAN, the corresponding user equipment is in the ECM connected state. If the MME which is in the ECM idle state is S1 connected with the E-UTRAN, it is in the ECM connected state.

When the user equipment is in the ECM idle state, the E-UTRAN does not have context of the user equipment. Accordingly, the user equipment which is in the ECM idle state performs a user equipment based mobility related procedure such as cell selection or cell reselection without any command from the network. On the other hand, when the user equipment is in the ECM connected state, mobility of the user equipment is managed by the command of the network. If the position of the user equipment is different from that known by the network in the ECM idle state, the user equipment notifies the network of its position through a tracking area (TA) update procedure.

In the LTE system, one cell constituting a base station eNB is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH).

In the meantime, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 4:
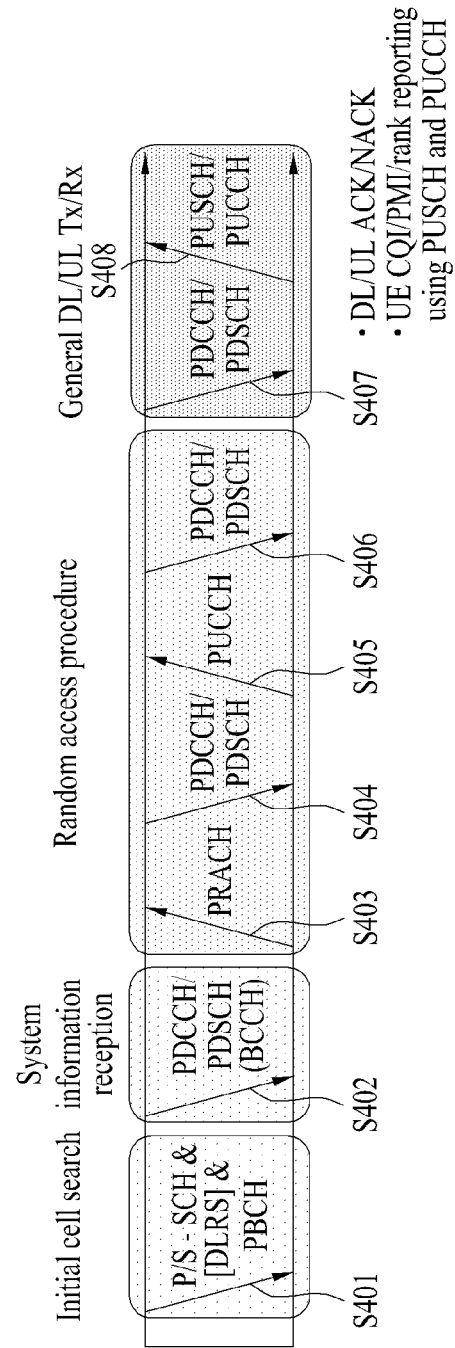
FIG. 4 is a diagram illustrating physical channels used in a 3GPP system and a general method for transmitting a signal using the physical channels.

FIG. 4 is a diagram illustrating physical channels used in a 3GPP system and a general method for transmitting a signal using the physical channels.

The user equipment performs initial cell search such as synchronizing with the base station when it newly enters a cell or the power is turned on (S401). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within the cell by receiving a physical broadcast channel (PBCH) from the base station. In the mean time, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S402).

In the meantime, if the user equipment initially accesses the base station, or if there is no radio resource for signal transmission, the user equipment may perform a random access procedure (RACH) for the base station (S403 to S406). To this end, the user equipment may transmit a preamble of a specific sequence through a physical random access channel (PRACH) (S403), and may receive a response message to the preamble through the PDCCH and the PDSCH corresponding to the PDCCH (S404). In case of a contention based RACH, a contention resolution procedure may be performed additionally.

The user equipment which has performed the aforementioned steps may receive the PDCCH/PDSCH (S407) and transmit a physical uplink shared channel (PUSCH) and a physical uplink control channel (PUCCH) (S408), as a general procedure of transmitting uplink/downlink signals. In particular, the user equipment receives downlink control information (DCI) through the PDCCH. In this case, the DCI includes control information such as resource allocation information on the user equipment, and has different formats depending on its usage.

In the meantime, the control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 5:
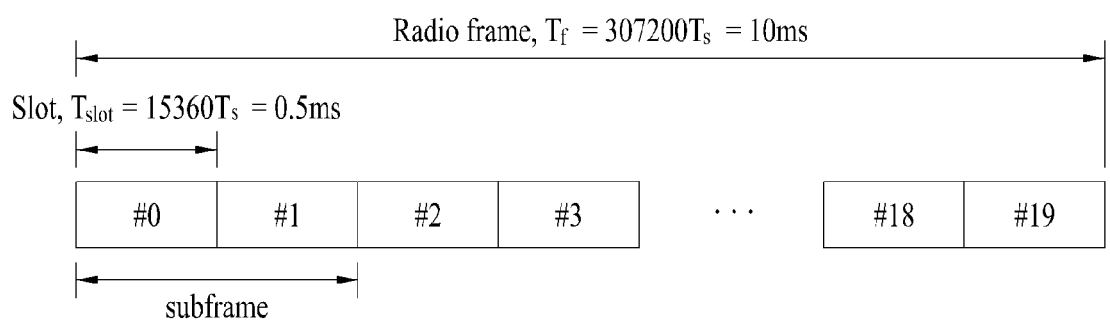
FIG. 5 is a diagram illustrating a structure of a radio frame used in an LTE system.

FIG. 5 is a diagram illustrating a structure of a radio frame used in an LTE system.

Referring to FIG. 5, a radio frame has a length of 10 ms ($327200 \times T_s$) and includes ten (10) subframes of an equal size. Each sub frame has a length of 1 ms and includes two slots. Each slot has a length of 0.5 ms ($15360 T_s$). In this case, $T_s$ represents a sampling time, and is expressed by $T_s=1/(15 \text{ kHz} \times 2048)=3.2552 \times 10^{-8}$ (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain. In the LTE system, one resource block includes twelve (12) subcarriers×seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

Figure 6:
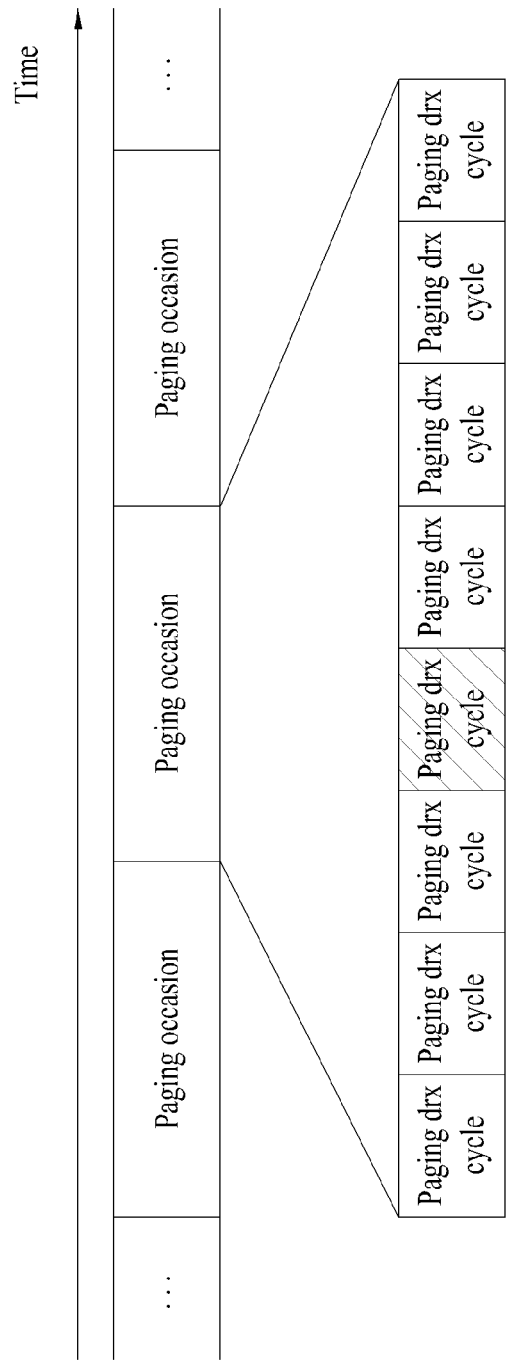
FIG. 6 is a diagram illustrating a general method for transmission and reception based on a paging message.

FIG. 6 is a diagram illustrating a general method for transmission and reception based on a paging message.

Referring to FIG. 6, the paging message includes a paging cause and a paging record of UE identity. When receiving the paging message, the user equipment may perform discontinuous reception (DRX) to reduce power consumption.

In more detail, a network includes several paging occasions (POs) per time period called paging DRX cycle, and a specific user equipment may acquire a paging message by receiving a specific paging occasion only. The specific user equipment does not receive a paging channel at the time except for the specific paging occasion time, and may be in a sleep state to reduce power consumption. One paging occasion time corresponds to one TTI.

The base station and the user equipment use a paging indicator (PI) as a specific value for indicating transmission of the paging message. The base station may notify the user equipment of transmission of paging information by defining a specific identifier (for example, paging-radio network temporary identity; P-RNTI) as a usage of PI. For example, the user equipment wakes up per DRX cycle and receives one subframe to identify the presence of the paging message. If the P-RNTI exists in L1/L2 control channel (PDCCH) of the received subframe, the user equipment may identify that the paging message exists in the PDSCH of the corresponding subframe. Also, if the UE identity (for example, IMSI) exists in the paging message, the user equipment receives a service by responding to the base station (for example, RRC connection or system information reception).

Next, system information will be described. The system information includes essential information that should be known by the user equipment to access the base station. Accordingly, the user equipment should receive all kinds of the system information before accessing the base station, and should have the latest system information. Since the system information is the information that should be known by all the user equipments within one cell, the base station transmits the system information periodically.

The system information may be divided into a master information block (MIB), a scheduling block (SB), and a system information block (SIB). The MIB allows the user equipment to know physical configuration of the corresponding cell, for example, bandwidth information. The SB indicates transport information of the SIBs, for example, transmission period. The SIB is the aggregation of related system information. For example, specific SIB includes only information of peripheral cells, and another SIB includes only information of an uplink radio channel used by the user equipment.

The base station transmits the paging message to notify the user equipment whether the system information has been changed. In this case, the paging message includes a system information change indicator. The user equipment receives the paging message in accordance with a paging cycle, and if the paging message includes the system information change indicator, the user equipment receives the system information transmitted through the BCCH which is a logical channel.

Hereinafter, a cell selection procedure and a cell reselection procedure will be described.

If the power of the user equipment is turned on, the user equipment should perform ready procedures for services by selecting a cell of proper quality. The user equipment which is in the RRC idle state should always select a cell of proper quality and should be ready to receive services through this cell. For example, the user equipment which is just turned on should select a cell of proper quality to be registered with the network. If the user equipment which is in the RRC connected state enters the RRC idle state, this user equipment should select a cell which will stay in the RRC idle state. In this way, to stay in a service standby state such as the RRC idle state, the procedure of allowing the user equipment to select a cell, which satisfies a specific condition, will be referred to as cell selection. Since the cell selection procedure is performed in a state that the user equipment fails to currently determine the cell which stays in the RRC idle state, it is important to select the cell quickly if possible. Accordingly, if the cell provides radio signal quality more than a certain reference, this cell may be selected during the cell selection procedure of the user equipment even though the cell does not provide the best radio signal quality to the user equipment.

If the user equipment selects the cell, which satisfies the reference for cell selection, it receives information required for the operation of the corresponding cell in the RRC idle state of the user equipment from the system information of the corresponding cell. After receiving all kinds of information required for the operation at the RRC idle state, the user equipment is on standby in the RRC idle state to request the network of services or receive services from the network.

After the user equipment selects a cell through the cell selection procedure, signal strength or signal quality between the user equipment and the base station may be changed due to mobility of the user equipment or change of a radio environment. If quality of the selected cell is deteriorated, the user equipment may select another cell that provides better quality. If the user equipment reselects a cell, it selects a cell that provides signal quality better than that of the currently selected cell. This will be referred to as a cell reselection procedure. The cell reselection procedure is basically intended to select a cell that provides the best quality to the user equipment, in view of quality of a radio signal. In addition to quality of the radio signal, the network may determine priority per frequency and notify the user equipment of the determined priority. The user equipment that has received the priority first considers the priority prior to quality basis of the radio signal during the cell reselection procedure.

Hereinafter, RRC connection procedure will be described in more detail.

RRC connection establishment procedure includes establishment of SRB1. The E-UTRAN completes RRC connection establishment procedure prior to SI connection establishment, that is, prior to UE context information reception from the EPC. As a result, AS layer security is not activated at the initial step of RRC connection. At the initial step of RRC connection, the E-UTRAN is set to allow the user equipment to perform measurement report, and the user equipment may transmit and receive a handover message after security activity is performed.

After receiving UE context information from the EPC, the E-UTRAN activates security configuration for integrity protection and ciphering through the initial security configuration activity procedure. The RRC message for activating security configuration is only for integrity protection, and may be applied after the security configuration activity procedure is completely performed. In other words, integrity protection is only applied to the response message to security activity, and ciphering and integrity protection are applied to the other messages for SRB2 and DRB establishment.

After the initial security configuration activity procedure is completely performed, the E-UTRAN performs a procedure for SRB2 and DRB establishment before receiving an acknowledgement message for the initial security activity from the user equipment. In this case, the E-UTRAN applies ciphering and integrity protection to RRC connection reconfiguration message for SRB2 and DRB establishment. In the meantime, the E-UTRAN releases RRC connection if the initial security activity is failed or RB establishment is failed. In other words, the E-UTRAN does not establish SRB2 and DRB prior to the security activity.

Figure 7:
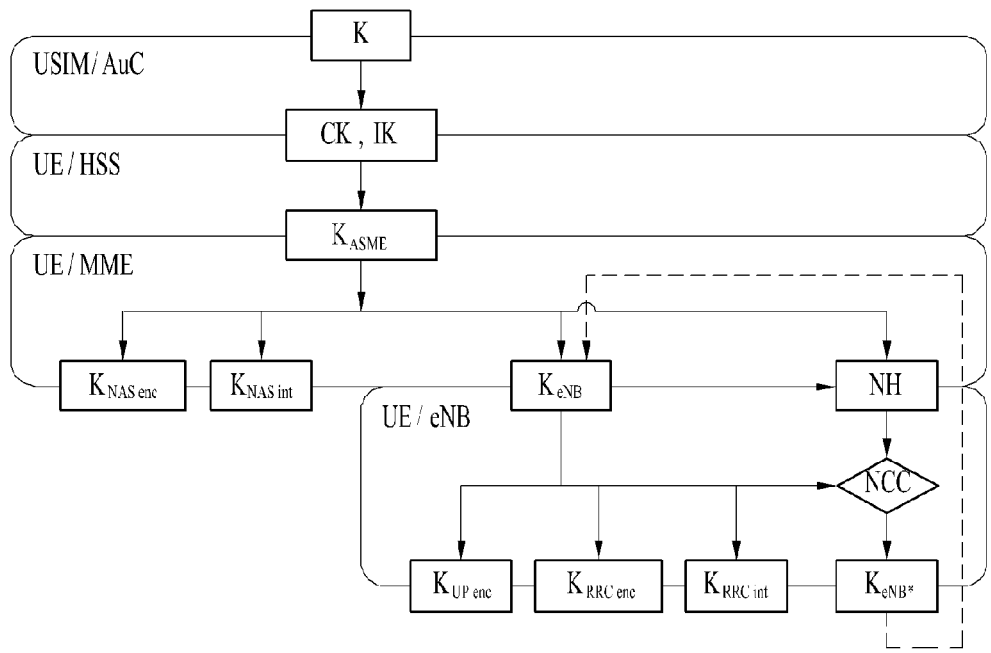
FIG. 7 is a diagram illustrating a general procedure of generating a security key.

Hereinafter, security will be described. FIG. 7 is a diagram illustrating a general procedure of generating a security key.

Referring to FIG. 7, the MME initiates an authentication and key agreement (AKA) procedure by requesting a home environment (HE) of authentication vectors. The HE responds to the MME through an authentication vector that includes a base key $K_{ASME}$. Accordingly, as a result of the AKA procedure, the EPC and the user equipment UE may share the base key $K_{ASME}$. NAS keys and parameters such as $K_{eNB}$ and NH (Next Hop) are generated from the base key $K_{ASME}$. Although the base key $K_{ASME}$ is not transferred to an entity outside the EPC, if the user equipment is shifted to the ECM-CONNECTED mode, the $K_{eNB}$ and NH may be transferred from the EPC to the eNB. The eNB and the user equipment UE may generate UP (User Plain) keys and RRC keys from the parameter $K_{eNB}$. The UP (User Plain) keys and RRC keys may be updated during handover.

$K_{eNB*}$ may be generated by the UE and the source eNB from one of both a combination of target PCI (Physical Cell ID), target frequency and $K_{eNB}$ and a combination of target PCI, target frequency and NH. Afterwards, $K_{eNB*}$ refers to new $K_{eNB}$ used for RRC and UP traffic in a target cell. If the user equipment is shifted to the ECM-IDLE mode, all the keys are deleted from the eNB.

Security of the AS layer includes RRC signaling in the SRB and ciphering of user data in the DRB together with integrity protection for RRC signaling in the SRB. The RRC layer controls security configuration which is a part of AS configuration. In this case, the security configuration includes two parameters such as 'keyChangeIndicator' and 'nextHopChainingCount' together with an integrity protection algorithm and a ciphering algorithm. The security configuration is used when the user equipment determines the AS layer security key during handover and/or RRC connection re-establishment. In the meantime, the integrity protection algorithm is common to SRB1 and SRB2, and the ciphering algorithm is common to all the RBs, that is, SRB1, SRB2 and DRB.

In more detail, the AS layer uses three different security keys, that is, a key $K_{RRCint}$ for integrity protection of RRC signaling, a key $K_{RRCen}$ for ciphering of RRC signaling, and a key $K_{UPenc}$ for ciphering of user data. These security keys are all generated from the parameter $K_{eNB}$. If RRC connection is established, since new AS layer security keys are generated from $K_{eNB}$, a new parameter for generating the keys is not required.

Integrity protection and ciphering of the RRC message for handover are performed by the source eNB on the basis of security configuration which is being used prior to handover. The integrity algorithm and the ciphering algorithm may be changed only after the handover is performed, and four AS layer security keys, that is, $K_{eNB}$, $K_{RRCint}$, $K_{RRCenc}$ and $K_{UPenc}$ are changed per handover and RRC connection re-establishment.

The parameter 'keyChangeIndicator' is used during handover, and indicates whether the user equipment use security keys related to the most recent available key $K_{ASME}$. Also, the parameter 'nextHopChainingCount' is used when a new parameter $K_{eNB}$ is generated by the user equipment during handover and RRC connection re-establishment. An intra cell handover procedure may be used to change the security keys in the RRC connected mode.

In the meantime, if the RRC connected mode is shifted to the RRC idle mode, the eNB deletes security keys of the user equipment which is the RRC idle mode, and the keys are stored in the MME only. In other words, the eNB and the user equipment UE delete NH, $K_{eNB}$, $K_{RRCenc}$, $K_{RRCint}$ and $K_{UPenc}$ but the MME and the UE store $K_{ASME}$, $K_{NASint}$ and $K_{NASenc}$.

Hereinafter, the initial security activity procedure will be described in more detail.

Figure 8:
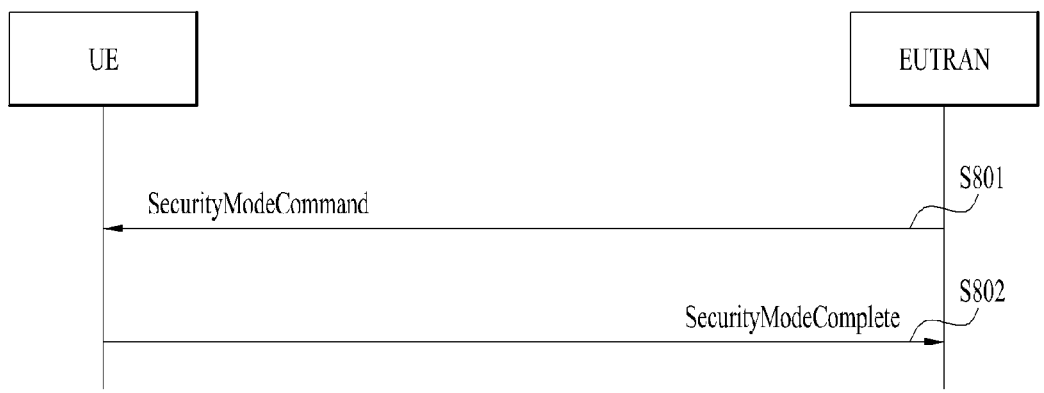
FIG. 8 is a diagram illustrating that a security activity procedure is performed successfully.
Figure 9:
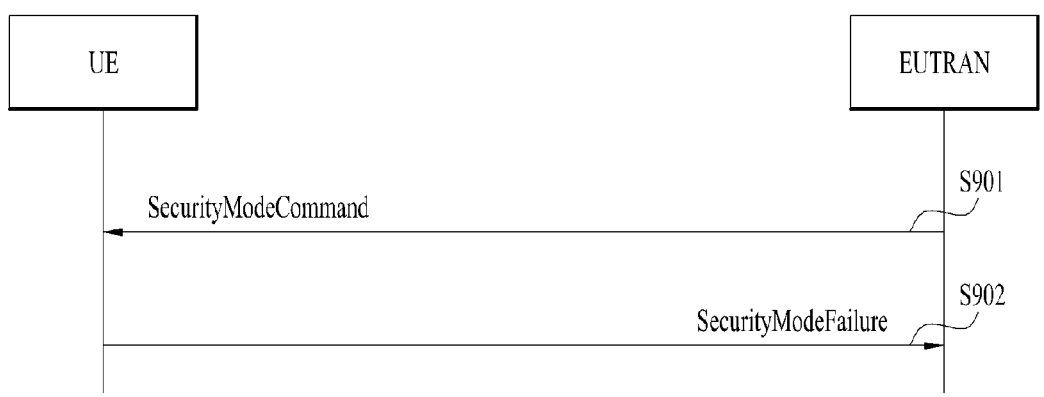
FIG. 9 is a diagram illustrating that a security activity procedure is failed.

FIG. 8 is a diagram illustrating that a security activity procedure is performed successfully, and FIG. 9 is a diagram illustrating that a security activity procedure is failed.

Referring to FIG. 8 and FIG. 9, the E-UTRAN initiates the security activity procedure by transmitting a security mode command message to the user equipment which is in the RRC connected mode at step 801 and step 901. As described above, this step includes that SRB1 is only established, and corresponds to the step prior to SRB2 and DRB establishment.

If the security mode command message is received as illustrated in the steps 801 and 901, the user equipment generates the key $K_{eNB}$. Also, the user equipment generates a key $K_{RRCint}$ associated with the integrity protection algorithm indicated by the security mode command message.

Afterwards, the user equipment commands integrity protection of the security mode command message based on the integrity protection algorithm and the key $K_{RRCint}$. If the integrity protection of the security mode command message is performed successfully, keys $K_{RRCenc}$ and $K_{UPenc}$ associated with the ciphering algorithm indicated by the security mode command message are generated.

Afterwards, the user equipment commands the lower layer to perform integrity protection for the RRC messages, which include a security mode complete message, by using the integrity protection algorithm and the key $K_{RRCInt}$ and at the same time is set to use the ciphering algorithm and the ciphering procedure based on the keys $K_{RRCenc}$ and $K_{UPenc}$.

After the above procedure is completed, it is regarded that the AS layer security is activated, and the user equipment ends the security activity procedure by transmitting the security mode complete message to the network as illustrated in step 802.

On the other hand, if the integrity protection of the security mode command message is failed, the user equipment uses configuration used prior to reception of the security mode command message. Also, the user equipment ends the security activity procedure by transmitting a security mode failure message to the network as illustrated in step 902.

Hereinafter, machine type communication (MTC) will be described.

The MTC means that communication is performed between machines without manipulation of a user. A user equipment used for the MTC is an MTC device. The MTC is also referred to as machine to machine (M2M). Services provided through the MTC are different from the existing communication services dependent upon manipulation of a user and may be applied to various categories as follows. For example, services such as tracking, metering, payment, medical services, and remote control may be provided by the MTC.

Figure 10:
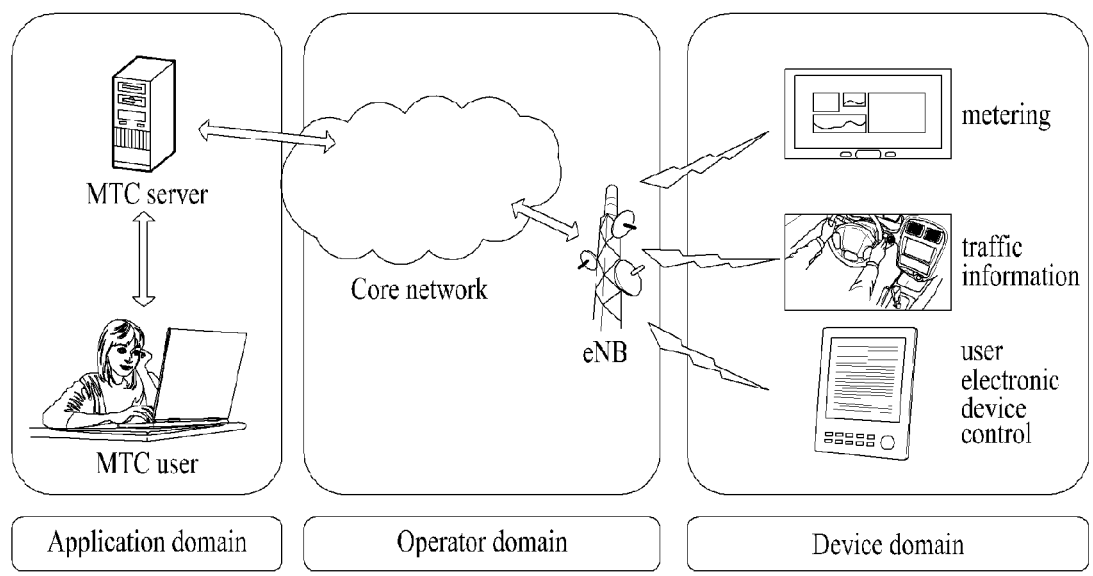
FIG. 10 is a diagram illustrating a structure of machine type communication (MTC)

FIG. 10 is a diagram illustrating a structure of machine type communication (MTC).

The MTC device performs communication with another MTC device or MTC server through a mobile communication network. The MTC server may provide a metering service, traffic information, a user electronic device control service, etc., which are the services provided through the MTC device, to an MTC user as shown in FIG. 10.

In order to efficiently support the MTC services, features of the MTC device, such as low mobility, delay tolerant, and short data communication, may be considered. In this respect, the MTC device may be referred to as a delay tolerant access support user equipment. Also, it is assumed that many MTC devices may exist within one cell.

According to the related art, if the RRC connected mode is shifted to the RRC idle mode, the eNB deletes the security keys stored therein. Accordingly, the information for the user equipment of the RRC idle mode may be maintained in the MME only. In other words, it is assumed that the eNB deletes the security keys currently stored in the memory without storing the state information of the user equipment any more. In particular, if the user equipment is shifted to the RRC idle mode, the eNB and the user equipment delete NH, $K_{eNB}$, $K_{RRCenc}$, $K_{RRCint}$ and $K_{UPenc}$ while the MME and the UE store $K_{ASME}$, $K_{NASint}$ and $K_{NASenc}$.

On the other hand, the user equipment may enter the RRC connected mode to transmit and receive data on its dedicated channel, and may be shifted to the RRC idle mode after completely transmitting and receiving data. In this case, in the case that short data are transmitted instantaneously like the MTC user equipment, since the security procedure is activated for data transmission and reception, the user equipment should perform security configuration again after the RRC connection establishment procedure. Accordingly, overhead may occur in that the MTC user equipment should perform security configuration per data transmission. In other words, like the MTC device, in case of the user equipment that transmits short data sometimes, a problem occurs in that signaling overhead caused by security activity is greater than the amount of data.

Accordingly, in order to reduce signaling overhead caused by security activity during RRC connection, according to the present invention, the user equipment configures RRC connection with the network, and performs security configuration on the basis of a security configuration message received from the network. Afterwards, if the user equipment releases RRC connection with the network and is shifted to the RRC idle mode, the security configuration is maintained for a certain time period.

Also, the user equipment which is in the RRC idle mode may transmit an RRC connection request message or RRC connection setup message, which includes a security activity indicator, and may establish another RRC connection by using the maintained security configuration without separate security configuration.

Preferably, the user equipment may receive the security configuration maintaining indicator from the network. In this case, the security configuration maintaining indicator may be included in the RRC connection setup message or RRC connection release message. In other words, the network, that is, eNB notifies whether to continue to store the security configuration configured together with the user equipment, or whether to use or activate the security configuration, through the RRC connection setup message or another downlink RRC message.

In the meantime, the user equipment may receive the security configuration message through at least one of a security mode command message and an RRC connection reconfiguration message. When receiving the security configuration message from the network, the user equipment may receive information as to whether the security configuration information should be stored in the RRC idle mode and information on security configuration sustain time together with the security configuration message.

If the user equipment is shifted to the RRC idle mode, the eNB and the user equipment may store the security configuration for the security configuration sustain time. In other words, the user equipment, which has received the information on the security configuration sustain time, starts a timer for the security configuration sustain time when receiving the security configuration information or releasing RRC connection, maintains the security configuration for the time when the timer is driven even after RRC connection is released, and deletes the stored security configuration if the timer expires.

Of course, the user equipment which is in the RRC connected mode or RRC idle mode may receive and store the security configuration information from one cell, and may delete the stored security configuration information regardless of expiration of the timer if the user equipment moves to another cell.

In the meantime, the security configuration may include a procedure of acquiring a ciphering algorithm (which is used in the AS layer) and generating a ciphering key by using the security configuration message received from the network. As a result, ciphering (or integrity protection) may be applied to one or more RBs.

Of course, if the user equipment receives a command to delete the security configuration from the network, it may delete the security configuration, which is maintained, regardless of expiration of the timer.

Figure 11:
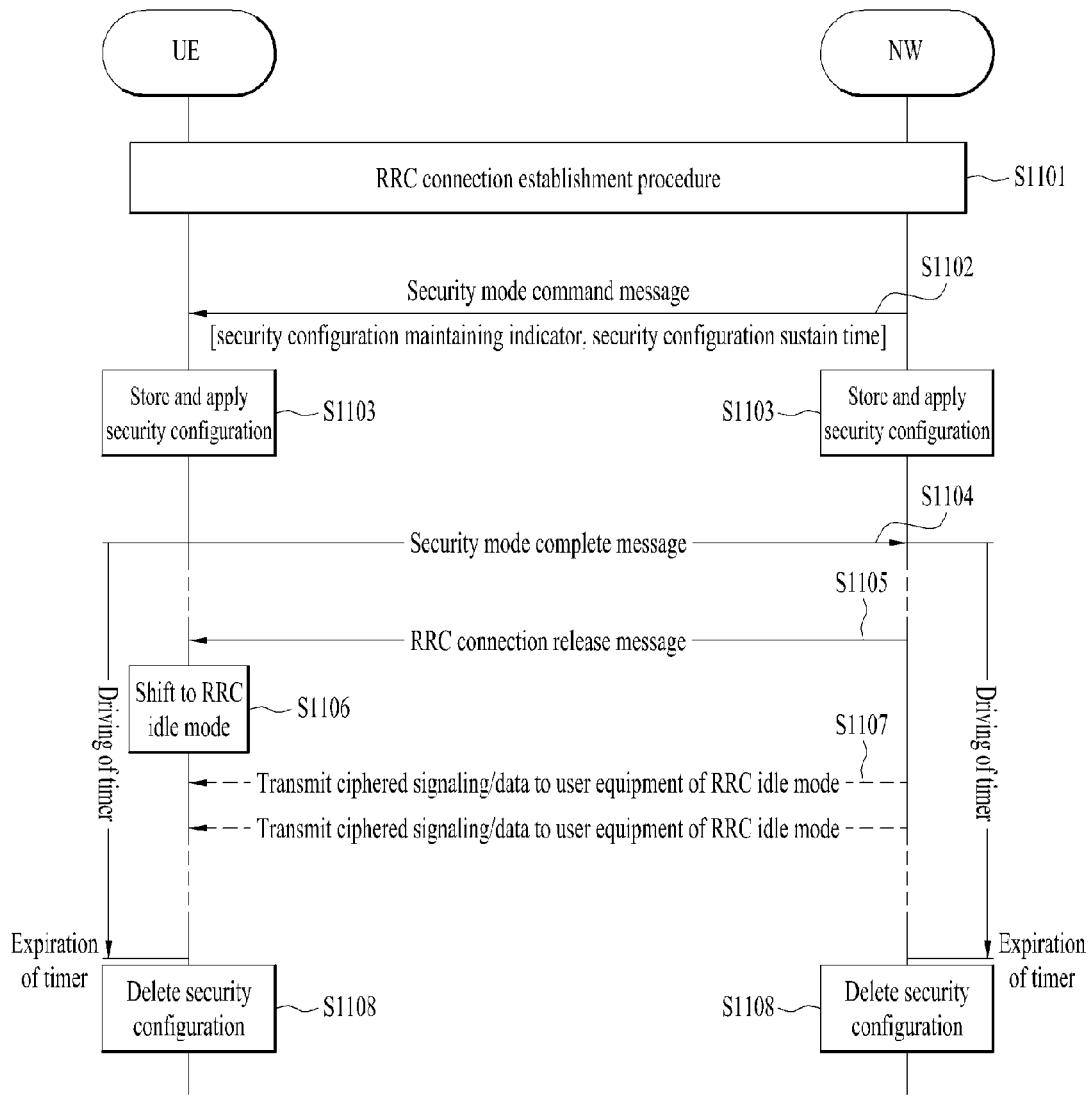
FIG. 11 is a diagram illustrating a method for transmitting and receiving a signal in accordance with the first embodiment of the present invention.

FIG. 11 is a diagram illustrating a method for transmitting and receiving a signal in accordance with the first embodiment of the present invention.

Referring to FIG. 11, the user equipment and the network which are in the RRC idle mode perform RRC connection establishment as illustrated in step 1101 and enter the RRC connected mode.

Afterwards, the user equipment may receive the security mode command message from the network as illustrated in step 1102. The security mode command message may include a security configuration maintaining indicator and information on the security configuration sustain time. In particular, the security configuration maintaining indicator may indicate whether to store and maintain the current security configuration after the user equipment is shifted to the RRC idle mode.

The user equipment, which has received the security mode command message, stores the security configuration information included in the security mode command message. Afterwards, the user equipment may generate one or more security keys by using a ciphering algorithm indicated by the security configuration information. Accordingly, the user equipment applies ciphering and security configuration based on the security key to SRB for DCCH and DRB for DTCH as illustrated in step 1103.

Also, the user equipment may initiate a timer corresponding to the security configuration sustain time. The user equipment may store and maintain the security configuration and the security key for the time when the timer is driven. Of course, the network may initiate the timer corresponding to the security configuration sustain time, and may store and maintain the security configuration and the security key together with user equipment identifiers such as C-RNTI, IMSI and TMSI for the time when the timer is driven. If the security activity is performed successfully, the user equipment transmits the security mode complete message to the network at step 1104.

Subsequently, if the user equipment receives the RRC connection release message from the network as illustrated in step 1105, it is immediately shifted to the RRC idle mode as illustrated in step 1106. However, according to the present invention, the user equipment may store and maintain the security configuration and the security key until the timer expires. In the meantime, the user equipment and the network may restart the timer when receiving the RRC connection release message.

Afterwards, the user equipment receives ciphered signaling or ciphered data from the network as illustrated in step 1107. In this case, the ciphered signaling or ciphered data may be received through a broadcast channel or a common channel carrying DTCH or DCCH. Accordingly, the user equipment may decode the received signaling or data by using the security configuration or security key stored therein.

If the timer expires, the user equipment and the network may delete the security configuration as illustrated in step 1108 regardless of the RRC connected mode or RRC idle mode of the user equipment.

Figure 12:
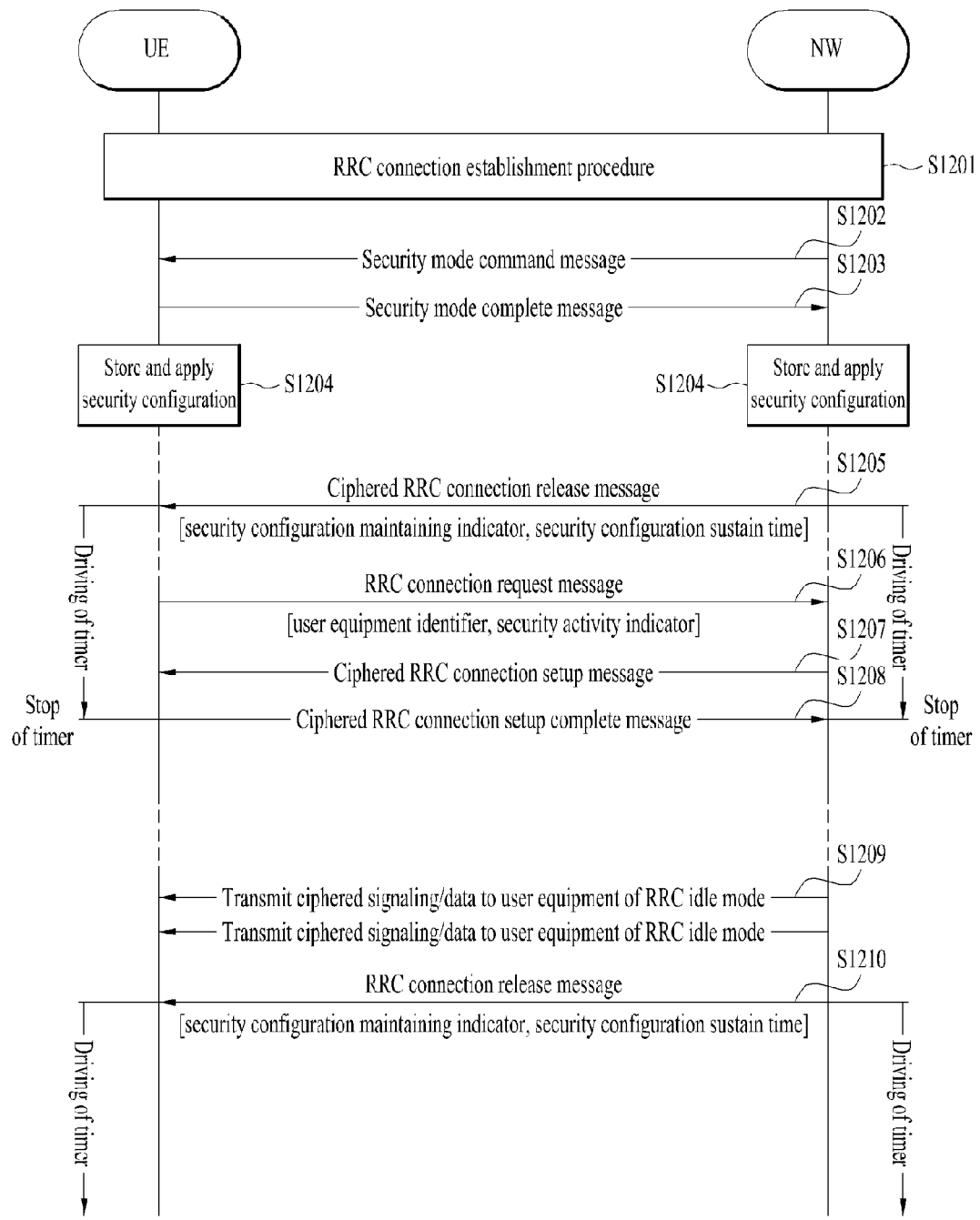
FIG. 12 is a diagram illustrating a method for transmitting and receiving a signal in accordance with the second embodiment of the present invention.

FIG. 12 is a diagram illustrating a method for transmitting and receiving a signal in accordance with the second embodiment of the present invention. In particular, FIG. 12 illustrates the user equipment and the network apply ciphering to SRB and DRB immediately after transmitting and receiving an RRC connection request message.

Referring to FIG. 12, the user equipment and the network which are in the RRC idle mode perform RRC connection establishment as illustrated in step 1201 and enter the RRC connected mode.

Also, the user equipment may receive the security mode command message from the network as illustrated in step 1202, and may transmit and receive the security mode complete message as illustrated in step 1203. In this case, the user equipment, which has received the security mode command message, stores the security configuration information included in the security mode command message. Afterwards, the user equipment may generate one or more security keys by using the ciphering algorithm indicated by the security configuration information. Accordingly, the user equipment applies ciphering and security configuration based on the security key to SRB for DCCH and DRB for DTCH as illustrated in step 1204.

Afterwards, the network may transmit the RRC connection release message to the user equipment at step 1205. The RRC connection release message may include a security configuration maintaining indicator and information on the security configuration sustain time. In particular, the security configuration maintaining indicator may indicate whether to store and maintain the current security configuration after the user equipment is shifted to the RRC idle mode. In other words, the user equipment, which has received the RRC connection release message, releases RRC connection, and stores the current security configuration and the security key. However, the user equipment and the network deactivate the current security configuration.

Also, the user equipment may initiate a timer corresponding to the security configuration sustain time. The user equipment may store and maintain the security configuration and the security key for the time when the timer is driven. Of course, the network may initiate the timer corresponding to the security configuration sustain time, and may store and maintain the security configuration and the security key together with user equipment identifiers such as C-RNTI, IMSI and TMSI for the time when the timer is driven.

Afterwards, it may be considered that the user equipment transmits the RRC connection request message on the CCCH as illustrated in step 1206. Preferably, the RRC connection request message is the message which is not ciphered. In this case, the RRC connection request message may include a security activity indicator for activating the security configuration stored together with the user equipment identifiers. The user equipment, which has transmitted the RRC connection request message, may activate the security mode by using the security configuration stored therein.

The network, which has received the RRC connection request message, may recognize what the security configuration stored in the user equipment is, by using the security activity and/or indicator. Accordingly, the network transmits the RRC connection setup message to the user equipment at step 1207. In this case, the RRC connection setup message is ciphered in accordance with the activated security mode and transmitted on the DCCH/SRB1. On the other hand, if security activity is not performed, the RRC connection setup message is transmitted on a CCCH/SRB0 in a state that the RRC connection setup message is not ciphered.

If the user equipment stores the security configuration together with configuration (that is, default configuration) of SRB1 or configuration broadcasted on the SIB, the user equipment may decode the ciphered RRC connection setup message.

On the other hand, if the RRC connection procedure is failed, the network transmits a paging message having a paging cause set as security failure to the user equipment, and the user equipment transmits an RRC connection request message having a connection cause set as security failure to the network in response to the paging message.

In the meantime, the user equipment, which has received and decoded the RRC connection setup message, transmits the RRC connection setup complete message ciphered using the stored security configuration and security key to the network on the DCCH/SRB1 at step 1208. In case of one of transmission of the RRC connection request message, decoding of the ciphered RRC connection setup message, transmission of the RRC connection setup message, and reception of ACK response to the ciphered RRC connection setup message, the user equipment and the network stop driving of the timer. Also, in case of one of decoding of the ciphered RRC connection setup message and transmission of the ciphered RRC connection setup message, the user equipment uses, that is, activates the stored security configuration.

Afterwards, the user equipment may receive the ciphered signaling and data from the network as illustrated in step 1209.

In the meantime, the network may again transmit the RRC connection release message to the user equipment at step 1210. The RRC connection release message may include a security configuration maintaining indicator and information on the security configuration sustain time. In particular, the security configuration maintaining indicator may indicate whether to store and maintain the current security configuration after the user equipment is shifted to the RRC idle mode. In other words, the user equipment, which has received the RRC connection release message, releases RRC connection and stores the current security configuration and security key. However, the user equipment and the network deactivate the current security configuration.

Figure 13:
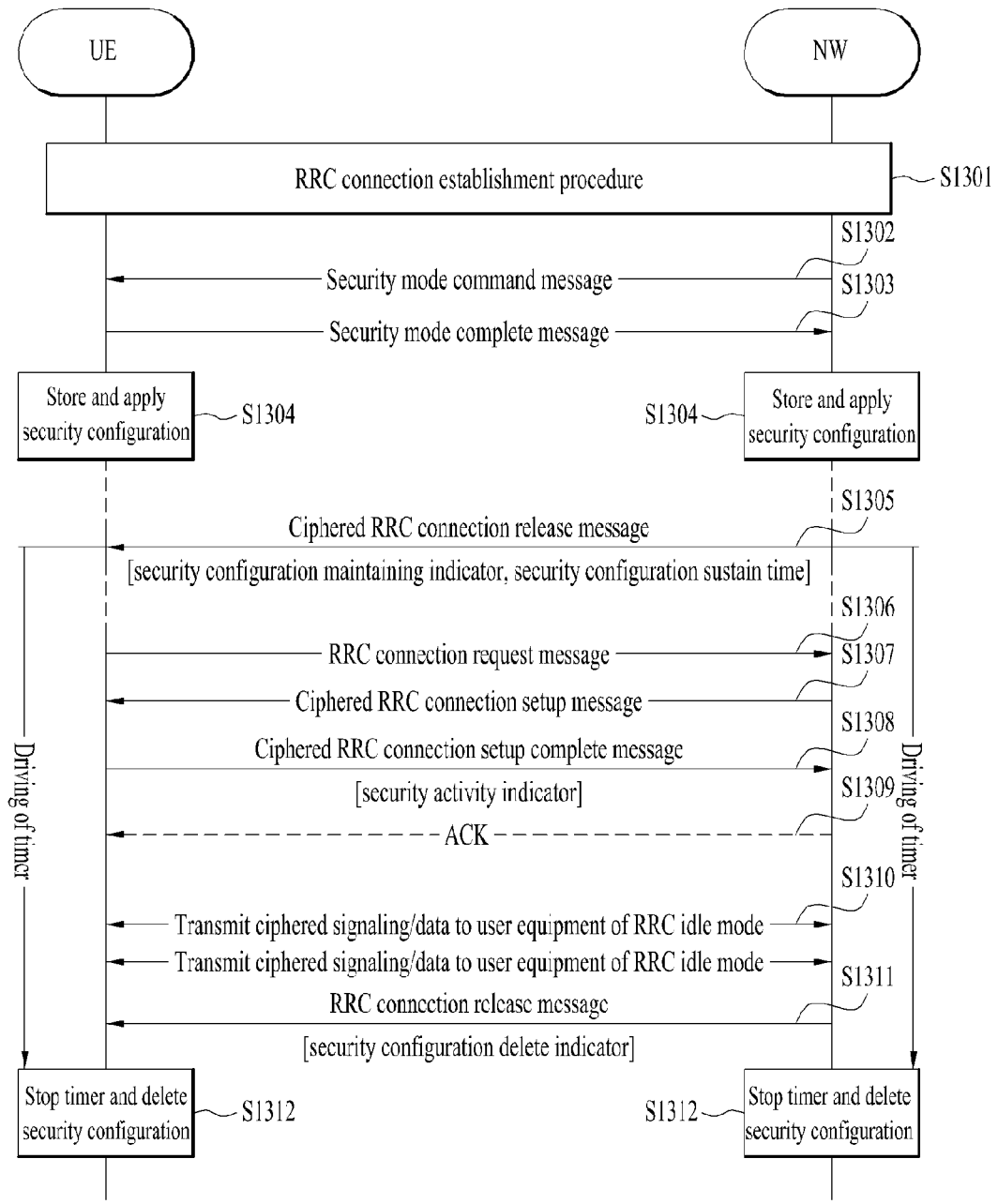
FIG. 13 is a diagram illustrating a method for transmitting and receiving a signal in accordance with the third embodiment of the present invention.

FIG. 13 is a diagram illustrating a method for transmitting and receiving a signal in accordance with the third embodiment of the present invention. Unlike FIG. 12, FIG. 13 illustrates the user equipment and the network activate security configuration and apply ciphering after transmitting and receiving an RRC connection setup message that includes a security activity indicator. It will be apparent that the case where security configuration is activated and ciphering is applied after ACK response to the RRC connection setup message is received may be applied to this embodiment.

Referring to FIG. 13, the user equipment and the network completely perform RRC connection establishment, and it is noted that driving of a timer is not stopped even in case of RRC connection.

Also, unlike FIG. 12, if the RRC connection release message, which includes a security configuration delete indicator, is received as illustrated in step 1311, the user equipment and the network stop driving of the timer at step 1312, and delete security configuration stored therein. If the security configuration is activated, the user equipment and the network deactivate the security configuration.

If the RRC connection release message, which does not include a security configuration delete indicator, is received, the user equipment and the network maintain driving of the timer and maintain the security configuration which is currently stored therein.

Figure 14:
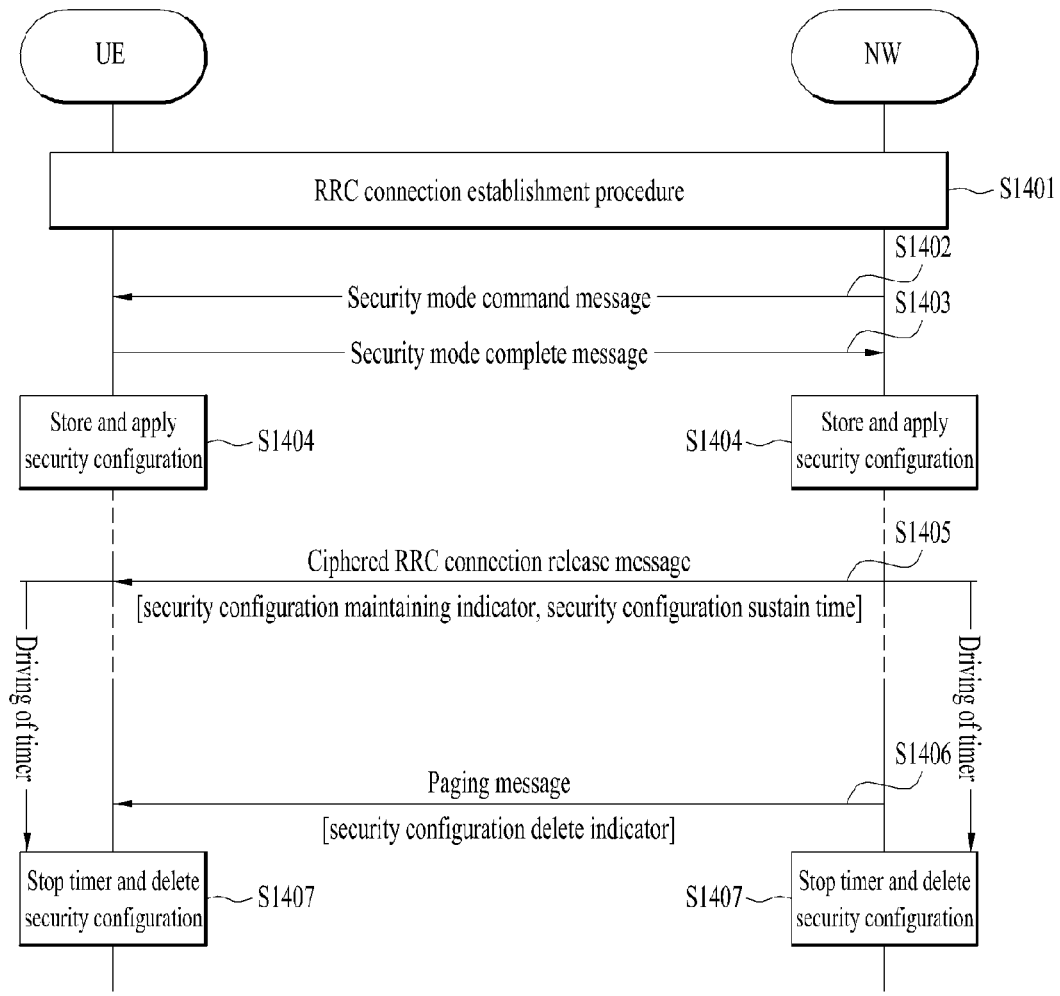
FIG. 14 is a diagram illustrating a method for transmitting and receiving a signal in accordance with the fourth embodiment of the present invention.

FIG. 14 is a diagram illustrating a method for transmitting and receiving a signal in accordance with the fourth embodiment of the present invention.

Referring to FIG. 14, if the user equipment stores security configuration, the network may transmit downlink signaling such as a paging message, which includes a security configuration delete indicator, as illustrated in step 1406, to delete the security configuration from a memory of the user equipment.

The user equipment, which has received the paging message including the security configuration deletion indicator, deletes the security configuration from its memory and stops driving of the timer. Of course, if the security configuration is activated, the user equipment deactivates the security configuration.

Figure 15:
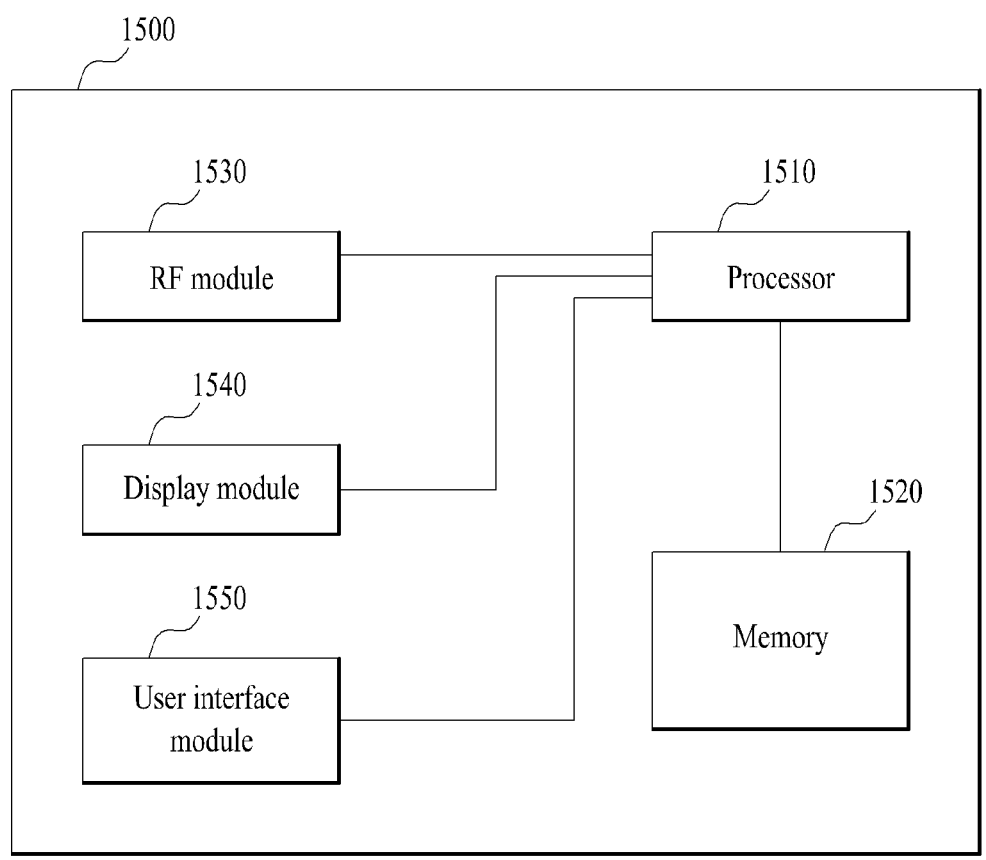
FIG. 15 is a block diagram illustrating a communication apparatus according to the embodiment of the present invention.

FIG. 15 is a block diagram illustrating a communication apparatus according to the embodiment of the present invention.

Referring to FIG. 15, the communication apparatus 1500 includes a processor 1510, a memory 1520, a radio frequency (RF) module 1530, a display module 1540, and a user interface module 1550.

The communication apparatus 1500 is illustrated for convenience of description, and some of its modules may be omitted. Also, the communication apparatus 1500 may further include necessary modules. Moreover, some modules of the communication apparatus 1500 may be divided into segmented modules. The processor 1510 is configured to perform the operation according to the embodiment of the present invention illustrated with reference to the drawings. In more detail, the detailed operation of the processor 1510 will be understood the disclosure described with reference to FIG. 1 to FIG. 10.

The memory 1520 is connected with the processor 1510 and stores an operating system, an application, a program code, and data therein. The RF module 1530 is connected with the processor 1510 and converts a baseband signal to a radio signal or vice versa. To this end, the RF module 1530 performs analog conversion, amplification, filtering and frequency uplink conversion, or their reverse processes. The display module 1540 is connected with the processor 1510 and displays various kinds of information. Examples of the display module 1540 include, but not limited to, a liquid crystal display (LCD), a light emitting diode (LED), and an organic light emitting diode (OLED). The user interface module 1550 is connected with the processor 1510, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the user equipment and the base station. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point.

The embodiment according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method for security configuration of a user equipment with a network in a wireless communication system and the apparatus for the same have been described based on the 3GPP LTE system, they may be applied to various wireless communication systems in addition to the 3GPP LTE system.

The invention claimed is:

1. A method for transmitting and receiving a signal with a network at a user equipment in a wireless communication system, the method comprising:
    performing initial security activation and storing security information according to the the initial security activation;
    receiving security configuration information from the network;
    transmitting or receiving data to and from the network;
    receiving a connection release message for releasing a first connection from the network; and
    releasing the first connection with the network
    wherein the security information is not maintained after releasing the first connection with the network, when a security configuration maintaining indicator is not received from the network,
    wherein the security information is maintained for a predetermined time according to the security configuration information even after releasing the first connection with the network and the user equipment is in idle state, when the security configuration maintaining indicator is received from the network, and
    wherein the security information is reused for a second connection establishment with the network, when the second connection establishment starts while the security information is being maintained within the predetermined time according to the security configuration information.

2. The method according to claim 1, wherein the security configuration maintaining indicator is included in the security configuration information or the connection release message.

3. The method according to claim 1, wherein the security configuration information includes information on security sustain time corresponding to the predetermined time.

4. The method according to claim 1, further comprising deactivating the security information when the first connection with the network is released; and
    transmitting a connection request message for the second connection, which includes a security configuration activity indicator, to the network.

5. The method according to claim 4, wherein the security information is activated when the connection request message is transmitted or when an acknowledgement message to the connection request message is received.

6. The method according to claim 5, the method further comprising driving a timer after the user equipment receives the connection release message from the network, wherein the timer starts again if the security information is activated before the timer expires.

7. The method according to claim 1, further comprising deleting the security information when a timer configured to drive for the predetermined time expires or a security configuration delete indicator is received from the network.

8. A method for transmitting and receiving a signal with a user equipment at a network in a wireless communication system, the method comprising:
    performing initial security activation procedure and storing security information;
    transmitting security configuration information to the user equipment;
    transmitting or receiving data to and from the user equipment;

transmitting a connection release message for releasing a first connection to the user equipment;

maintaining the security information for a predetermined time even after releasing the first connection with the user equipment and the user equipment is in idle state, when transmitting a security configuration maintaining indicator as being included the security configuration information or the connection release message, and wherein the security information is reused for a second connection establishment with the user equipment, when the second connection establishment starts while the security information is being maintained, wherein, the security information is not maintained after releasing the first connection with the user equipment, when the security configuration maintaining indicator is not transmitted.

9. The method according to claim 8, further comprising releasing the first connection with the user equipment; and driving a timer corresponding to the predetermined time, wherein the security configuration information is maintained while the timer is being driven.

10. The method according to claim 8, further comprising deactivating the security configuration information when the first connection with the user equipment is released; and receiving a connection request message, which includes a security configuration activity indicator, from the user equipment.

11. The method according to claim 10, wherein the security configuration information is activated when the connection request message is received or when an acknowledgement message to the connection request message is transmitted.

12. The method according to claim 11, wherein the timer starts again if the security configuration information is activated before the timer expires.

13. The method according to claim 8, further comprising deleting the security configuration information when the timer expires or a security configuration delete indicator is transmitted to the user equipment.

\* \* \* \* \*